United States Patent [19]

Ackermann et al.

[11] Patent Number: 4,512,539
[45] Date of Patent: Apr. 23, 1985

[54] ESCAPE SLIDE DEPLOYMENT SYSTEM

[75] Inventors: Albert B. Ackermann, Fountain Valley, Calif.; Donald K. Jones, Bellevue; Timothy M. Holey, Marysville, both of Wash.

[73] Assignee: The Boeing Company, Seattle, Wash.

[21] Appl. No.: 523,184

[22] Filed: Aug. 15, 1983

[51] Int. Cl.$^3$ .............................................. B64D 25/14
[52] U.S. Cl. .......................... 244/137 P; 244/DIG. 2
[58] Field of Search .......... 244/DIG. 2, 137 P, 129.6, 244/118.3; 105/348; 49/37; 182/48

[56] References Cited

U.S. PATENT DOCUMENTS

| | | |
|---|---|---|
| 2,990,148 | 6/1961 | James . |
| 3,633,853 | 1/1972 | Collins . |
| 3,771,749 | 11/1973 | Smialowicz . |
| 3,799,479 | 3/1974 | Roeder et al. . |
| 3,852,854 | 12/1974 | Sigrud et al. . |
| 3,941,337 | 3/1976 | Molter et al. . |
| 3,973,744 | 8/1976 | Hintzman . |
| 4,106,729 | 8/1978 | Bergman et al. . |
| 4,125,235 | 11/1978 | Fitzgerald et al. . |
| 4,375,877 | 3/1983 | Shorey .......................... 244/DIG. 2 |

FOREIGN PATENT DOCUMENTS 1463822  2/1977  United Kingdom .

*Primary Examiner*—Galen L. Barefoot
*Attorney, Agent, or Firm*—Christensen, O'Connor, Johnson & Kindness

[57] ABSTRACT

A deployment apparatus for use with an escape slide stowed in a pack within an aircraft and adjacent the sill region of an aircraft door opening is operable to deploy the stowage pack from its position within the aircraft fuselage to a position exterior to the aircraft fuselage upon opening of a door mounted in the door opening. The deployment apparatus includes a deployment arm that is hingedly affixed at a first end thereof to the escape slide stowage pack. A second end of the deployment arm is adjacent the interior surface of the aircraft door when the door is in its closed position. An arming device is pivotally mounted on the interior of the aircraft door and is movable between an armed and an unarmed position. In the unarmed position, the arming device is spaced from the second end of the deployment arm and in the armed position the arming device engages the second end of the deployment arm. A track is affixed to the interior surface of the door and with the arming device in its armed position the arming device cooperates with the track to guide the second end of the deployment arm into the track as the door is moved from the closed toward the open position. The track is configured to hold the second end of the deployment arm captive during a predetermined degree of movement of the aircraft door so as to pull the stowage pack through the door opening as the door is opened. When the door has exceeded the predetermined degree of movement, the second end of the deployment arm is released from the track so that the stowage pack can fall under the force of gravity through the door opening of the aircraft. The deployment arm and track are configured so that upon release of the deployment arm by the track, the center of gravity of the stowage pack and escape slide is exterior to the aircraft fuselage. Preferably, the arming device is connected by a linkage to a handle mounted interior to the aircraft and operable by a crewmember to arm and disarm the deployment apparatus.

9 Claims, 8 Drawing Figures

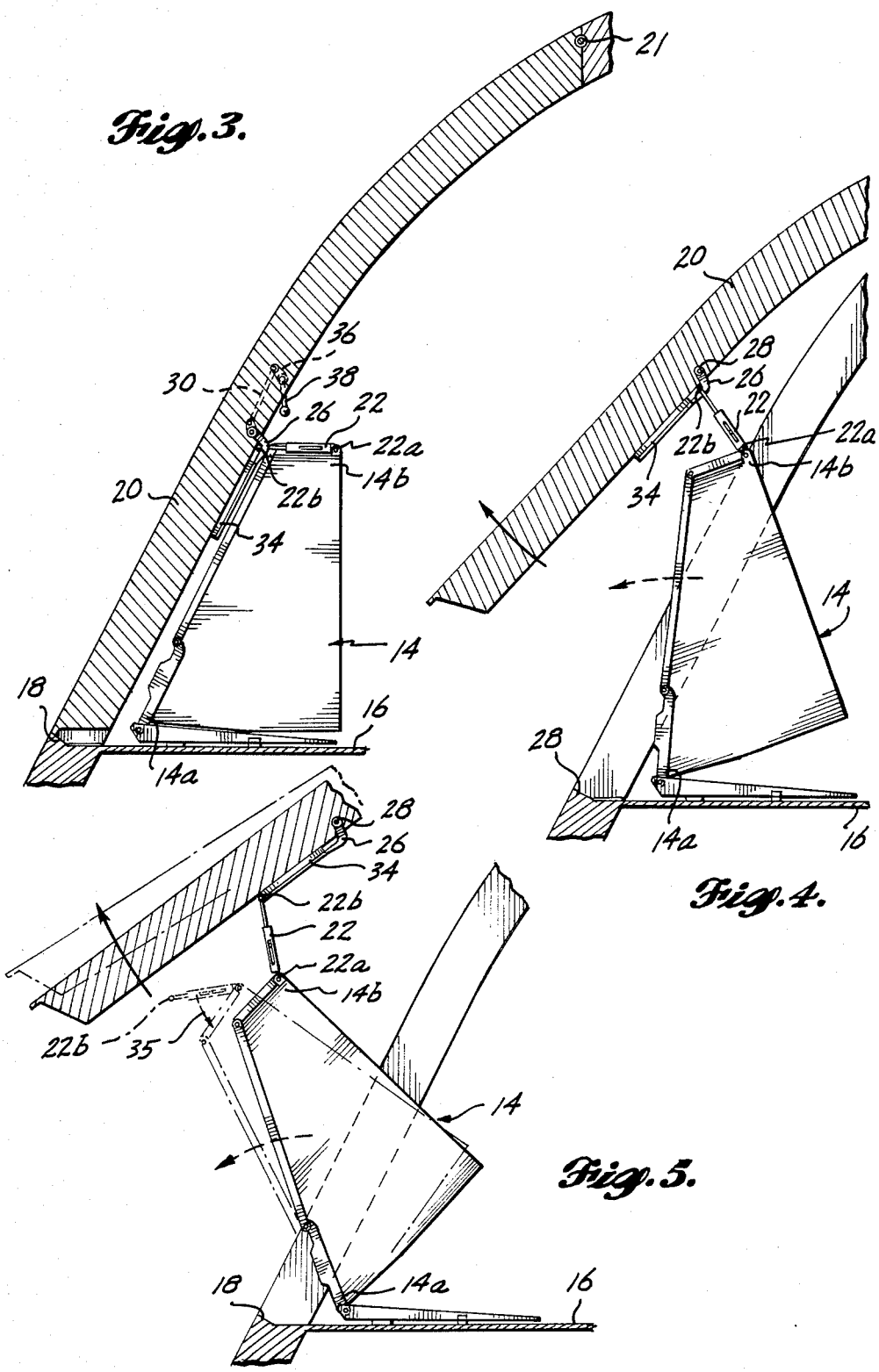

ESCAPE SLIDE DEPLOYMENT SYSTEM

BACKGROUND OF THE INVENTION

This invention relates to aircraft emergency evacuation systems employing inflatable escape slides packed in stowage packs and more particularly relates to an apparatus for automatically deploying the stowage pack containing such inflatable escape slide through a doorway.

Emergency evacuation systems that employ inflatable escape slides are installed on virtually all passenger-carrying aircraft to provide rapid evacuation of the passengers and crew during on-ground emergencies, such as those following an emergency landing or a ditching at sea. During normal aircraft operation, the deflated escape slide is generally packed in a compact package or container that is mounted on the interior surface of the aircraft door or on the floor of the aircraft at a position adjacent the door. In most systems, the upper end of the escape slide includes a girt that encompasses a girt bar that is connected to the aircraft floor at a position immediately inside the door. In the event of an emergency, the door is opened and the escape slide is automatically or manually moved through the doorway and inflated so as to form a slide that extends downwardly from the door sill to the surface of the ground or water.

It can be readily recognized and is well known in the art that numerous design and manufacturing constraints apply to emergency evacuation systems of the above-described type. For example, the system should be capable of rapid actuation and deployment to facilitate speedy evacuation of the aircraft. Generally, this requires an automatic deployment sequence that is initiated by simply actuating the aircraft door or by some other simple operation that is easily implemented by a passenger or crewmember. To permit use of the door during nonemergency conditions, an arming and disarming device must be provided that can be activated by a crewmember in response to the given situation.

Various types of doors are employed in modern aircraft and the evacuation system must be either specifically configured for a particular type of door or must be adapted or adaptable thereto. For example, in prior art evacuation systems that operate in conjunction with a plug-type door, of the variety wherein the door is opened by moving it outwardly and then longitudinally in the direction that is generally parallel to the outside of the aircraft, a stowed evacuation system is positioned adjacent the door so as to be available should an emergency condition develop. In another type of escape slide the deflated slide is stowed within the lower portion of the door and is ejected therefrom as the door is moved outwardly during an emergency evacuation procedure. In the more preferred arrangements for use with overhead doors, the evacuation system is oftentimes attached to the interior of the door and moves upwardly with the door when it is opened under normal, nonemergency conditions. With this type of arrangement, the stowed evacuation system remains attached to the aircraft floor by means of a girt bar or other fastening arrangement when such an overhead door is moved upwardly for emergency evacuation. As the door reaches a predetermined height, the stowed evacuation system is either forcibly ejected or falls from the door under the force of gravity and the escape slide is inflated by means of aspirators or turbine-type air pumps. In each of these systems, the girt bar usually must be locked into place in front of the aircraft door to arm the evacuation system and must be disconnected therefrom so that the door can be utilized without deploying the escape slide. Such a system may or may not be usable with or adaptable to various other types of doors, such as the upwardly and outwardly swinging emergency door of the type that is presently used on commercial aircraft such as the Boeing 747.

An escape slide stowage pack for use with an outwardly and upwardly swinging door is described and illustrated in U.S. Pat. No. 4,375,877 issued Mar. 8, 1983 to Thomas H. Shorey and owned by the assignee of the present application. The emergency evacuation system described in the aforementioned patent is configured so that the deflated escape slide and compressed gas cylinders and turbine-type pumps for inflating the escape slide are contained in a stowage pack that is formed by a plurality of hinged together, substantially rectangular links hingedly attached to the packboard that facilitate the system deployment. More specifically, the system packboard is basically a shell-like structure having a bottom panel, two upwardly extending side panels and a back panel that interconnects the two side panels. When the system is assembled for stowage in the aircraft, substantially rectangular, hinged together links extend between the packboard bottom and the back panel to form the top and fourth side surface of the stowage pack with the longitudinal edge of the links being hinged to the upward edge of the packboard back panel. To facilitate stowage of the evacuation system in a position closely adjacent an outwardly and upwardly swinging escape door, the forward edges of the packboard side panels extend upwardly from the packboard bottom panel and are angularly directed toward the packboard back panel. In this arrangement, one of the rectangular links forms the top surface of the stowage package and the two remaining rectangular links extend along the two angularly projecting regions of the packboard side panels to form the forward face of the slide stowage pack. The longitudinal edge at the lowermost link is hinged to one edge of a baseplate that can be securely interconnected with the aircraft floor at a position adjacent the associated escape door. In particular, the baseplate, links, and packboard are interconnected so that the links permit the packboard to swing arcuately downward and against the outer surface of the aircraft fuselage. In addition, the system baseplate is preferably configured and arranged to permit the evacuation system stowage pack to be moved away from the door with relative ease so that the door can be utilized for aircraft servicing and other nonemergency uses.

In operation, the emergency evacuation system is stowed in the above-described shell and is secured to the aircraft floor adjacent the interior of the associated emergency door. It is necessary to provide a deployment system for moving the packboard out through the door when it is opened under emergency conditions. Typically, the deployment device need only pull the assembled stowage pack far enough outside the door so that the force of gravity will carry the pack out through the door deploying the slide.

It is therefore an object of the present invention to provide a deployment system for an escape slide pack for use with an outwardly and upwardly swinging door that can be positively latched to the door to reliably deploy the slide in every instance due to the critical nature of the proper functioning of the escape slide assembly.

It is further an object of the invention to provide such a deployment system that is easily armed and disarmed so that the door can be opened without deploying the emergency escape slide pack in nonemergency situations.

It is further an object of the invention to provide a deployment system for the escape slide pack that will operate to move the pack sufficiently through the door to allow deployment of the pack by the force of gravity even in conditions in which the aircraft is not in a level position with respect to the ground, but is tilted to some degree.

SUMMARY OF THE INVENTION

In accordance with the above-stated objects, a deployment system for use with an escape slide stowed in a pack adjacent the sill region of an aircraft door includes a deployment arm, a first end of which is hingedly affixed to the escape slide pack. A second end of the deployment arm is adjacent the interior surface of the aircraft door. An arming means is pivotally mounted on the interior of the aircraft door and is movable between an armed and unarmed position. In the armed position, the arming means engages the second end of the deployment arm and in the unarmed position the arming means is spaced from the second end of the deployment arm. A guide track means is affixed to the interior surface of the door and the arming means cooperates with the guide track means to guide the second end of the depolyment arm into the guide track means when the arming means is in the armed position and the door is moved toward an open position. The guide track means is configured to hold the second end of the deployment arm captive during a predetermined degree of movement of the aircraft door toward the open position and to release the second end of the deployment arm once the predetermined degree of motion of the door has been exceeded.

The deployment arm and guide track are of a size such that they cooperate to move the pack through the door opening as the aircraft door is opened and the guide track is designed to release the deployment arm at such time as the pack center of gravity is outside the aircraft so that the force of gravity will act upon the center of gravity of the pack to cause the pack to fall out the doorway, thereby deploying the escape slide. Preferably, the arming means is coupled by a linkage means to an arming handle mounted on or adjacent the aircraft door and easily accessible by persons inside the aircraft to operate the arming means, thereby arming and disarming the deployment system.

BRIEF DESCRIPTION OF THE DRAWINGS

The operation and advantages of the depolyment system of the present invention will be better understood by those of ordinary skill in the art and others upon reading the ensuing specification when taken in conjunction with the appended drawings wherein:

FIG. 3 is a side elevational view in somewhat schematic representation of an escape slide pack mounted adjacent an aircraft door with the door in the closed position;

FIG. 4 is a side elevational view of the escape slide pack and door of FIG. 3 with the door in the partially open position and the escape slide pack beginning deployment;

FIG. 5 is a side elevational view of the escape slide pack of FIG. 3 showing the sequence of operation of the deployment system to draw the escape slide pack through the door opening;

DETAILED DESCRIPTION OF THE PREFERRED EMBODIMENT

Figure 1:
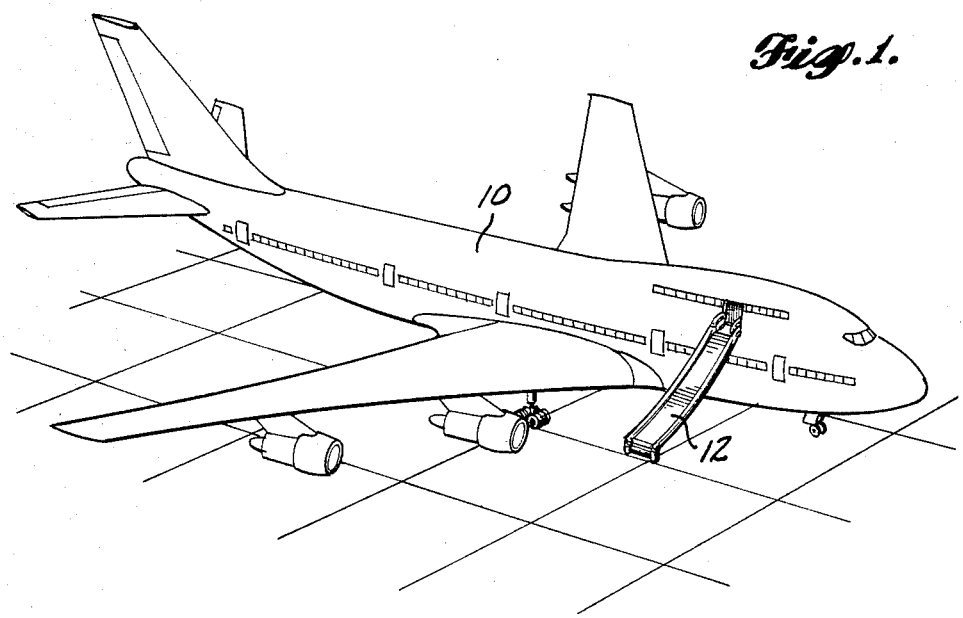
FIG. 1 is an isometric view of a commercial jet aircraft having an escape slide deployed from an emergency exit thereof.
Figure 2:
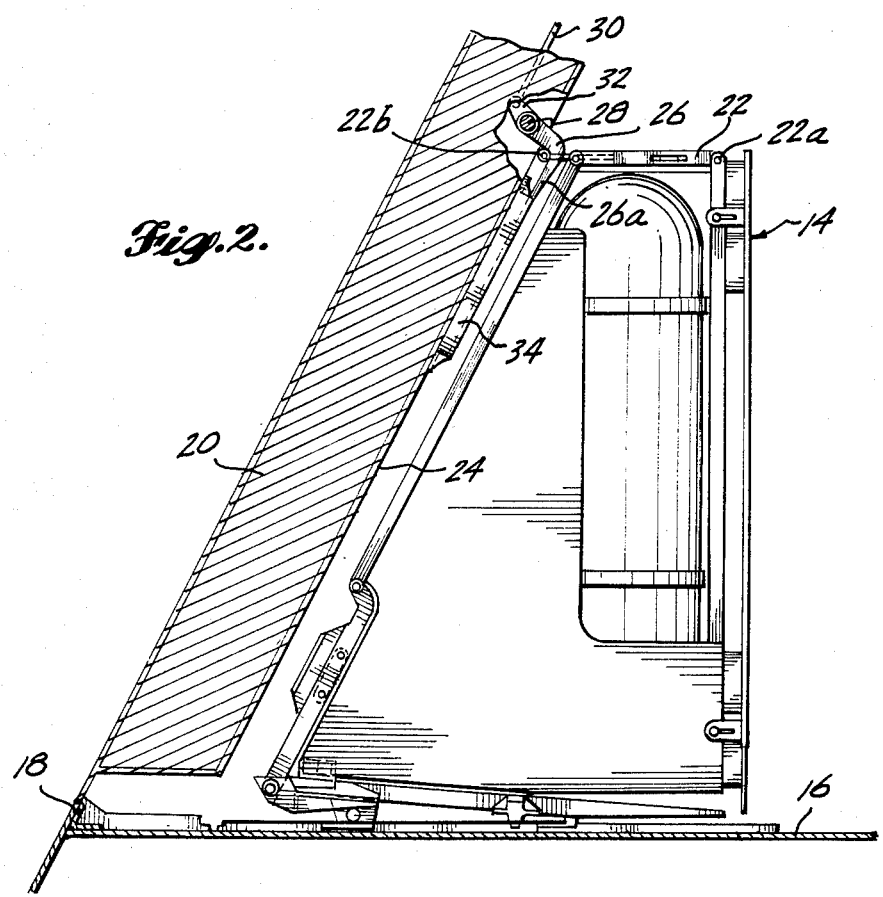
FIG. 2 is a side elevational view of an escape slide stowage pack having one embodiment of the deployment system of the present invention incorporated therein.

Referring now to FIG. 1, a commercial jet aircraft 10 is shown on the ground having an escape slide 12 deployed from a forward door of the aircraft extending from the cabin of the aircraft to the ground. FIG. 2 illustrates a typical escape slide stowage pack 14 resting on the floor 16 of the interior of the aircraft adjacent the sill 18 of the door opening. The door 20 of the aircraft is in the closed position. The escape slide stowage pack 14 is of the type described in U.S. Pat. No. 4,375,877, issued Mar. 8, 1983 to Thomas H. Shorey and incorporated herein by reference. The details of construction of the escape slide stowage pack form no part of the present invention, the only requirement being that the stowage pack be of the type that deploys the escape slide stored therein upon movement of the pack through the doorway of the aircraft. Further, the deployment system of the present invention is described in connection with an aircraft door that opens outwardly and upwardly with swinging movement, hingedly attached at the upper end of the door to the lintel of the aircraft door opening.

The deployment system of the present invention includes a deployment arm 22 pivotally mounted at a first end 22a thereof to the upper rear corner of the escape slide stowage pack 14. A second end 22b of the deployment arm is adjacent the inner surface 24 of the door 20. The deployment system is shown in the armed position and a hook 26 is affixed to a torque tube 28 rotatably mounted to the door 20. The hook is shown in the armed position engaging the second end 22b of the deployment arm. Movement of the hook 26 between the armed and unarmed positions is controlled by a control rod 30 attached at a first end thereof to a crank 32, which in turn is affixed to the torque tube 28 to which the hook 26 is affixed. The control rod 30 preferably is coupled to a handle or lever easily accessible by persons inside the aircraft for use in moving the hook 26 between the armed and disarmed positions. The tine 26a of the hook is in line with a guide track 34 affixed to the inner surface 24 of the door 20. The guide track 34 is an elongate member mounted on the door in vertical orientation. The tine 26a of the hook 26 guides the second end 22b of the deployment arm into the guide track as the door 20 is opened, as will be described in greater detail below.

Referring now to FIGS. 3, 4, and 5, the sequence of deployment of the escape slide stowage pack using the deployment system of the present invention is illustrated. FIG. 3 shows the stowage pack 14 in its stowed position adjacent the sill 18 of the door with the door 20 in the closed position. The door 20 is hingedly attached at an upper end to the lintel 21 of the door opening in a conventional manner so that it opens by swinging outwardly and upwardly. The hook 26 is shown in the armed position engaging the second end 22b of the deployment arm 22. In FIG. 3 it can be seen that the control rod 30 is pivotally attached at a second end to a crank 36 that in turn is connected to a handle assembly 38 operable to arm and disarm the deployment system. In FIG. 4, the door 20 is shown in a partially open position and the stowage pack 14 is pivoted outboard on a forward lower corner 14a due to the force exerted on the upper rear corner 14b by the deployment arm, which in turn is being pulled upwardly and outboard along with the door by the engagement of hook 26 with the second end 22b of the deployment arm. As the door 20 continues to open, the second end 22b of the deployment arm 22 engages the track in the guide track assembly 34 and moves outboard and down along the track until it reaches the lowermost end of the track as illustrated in solid lines in FIG. 5. As the door continues to the position shown by the dot-dash lines of FIG. 5, the second end 22b of the deployment arm 22 will disengage from the open bottom of the guide track assembly 34. Preferably, the deployment arm 22 is spring biased so that when it disengages from the guide track it will move as illustrated by arrow 35 to a position closely adjacent the upper portion of the escape slide stowage pack 14. The dimensions of the guide track 34 and the deployment arm 22 are designed so that at the point of release of the deployment arm 22 from the guide track assembly 34, the center of gravity of the escape slide stowage pack would be such that it is located outside the aircraft and the force of gravity will cause the stowage pack to continue its outboard and downward pivoting motion to deploy the escape slide as discussed in U.S. Pat. No. 4,375,877 referred to above.

Figure 6:
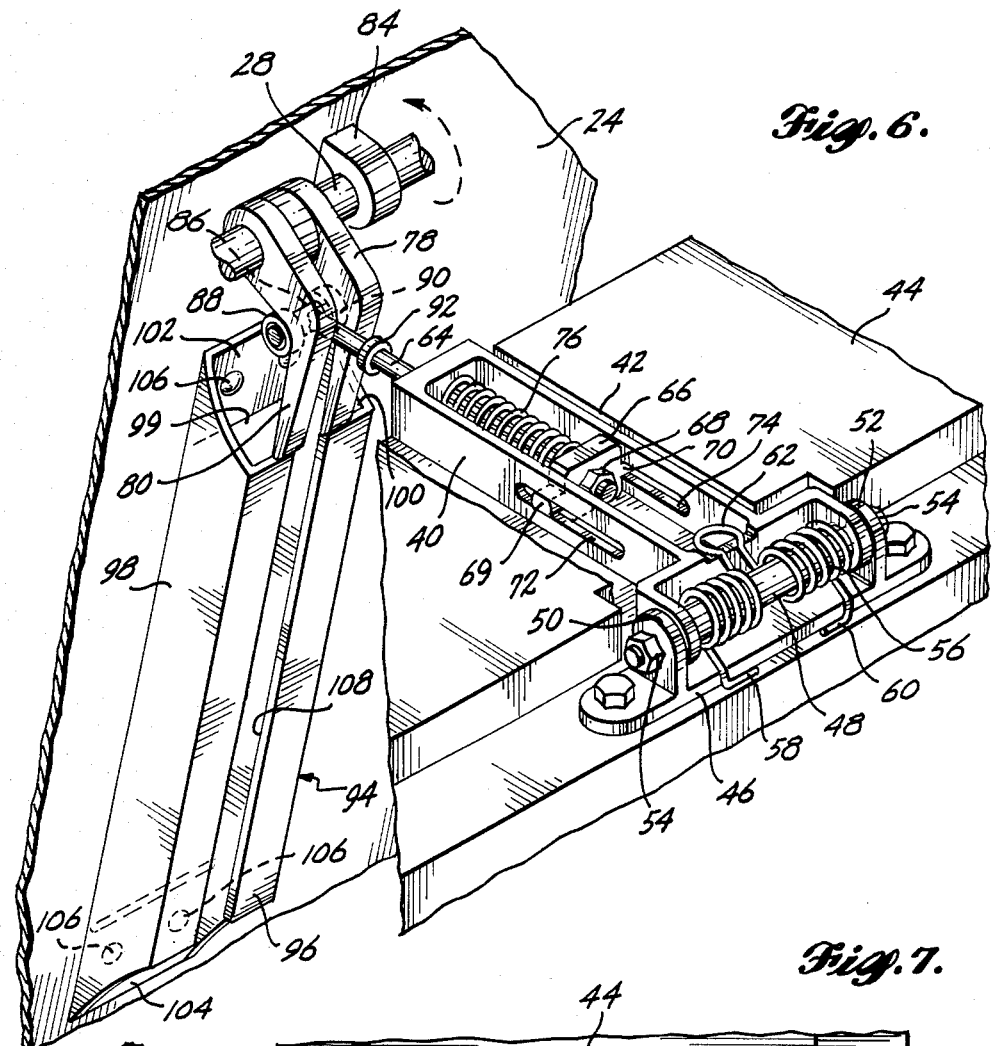
FIG. 6 is an isometric view in expanded scale of an escape slide deployment system made in accordance with the principles of the present invention in the armed position.
Figure 7:
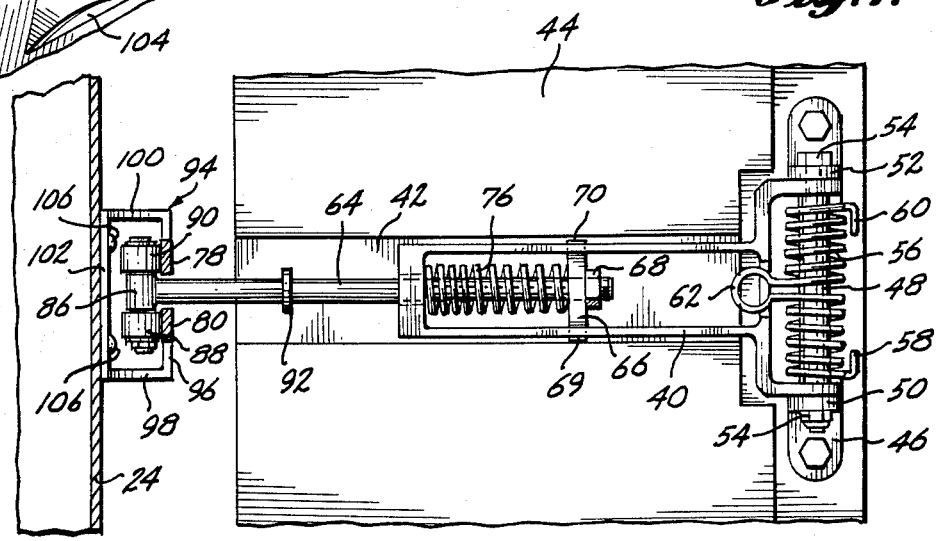
FIG. 7 is a plan view of the escape slide deployment mechanism of FIG. 6.
Figure 8:
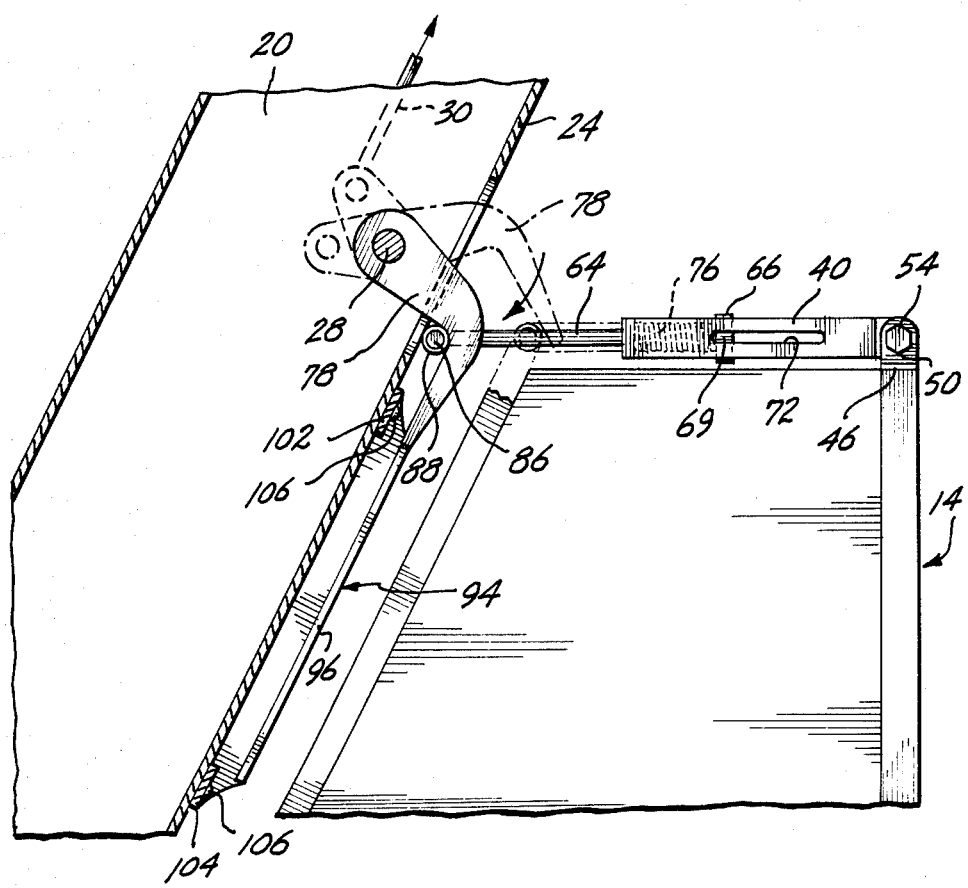
FIG. 8 is a side elevational view of the escape slide mechanism of FIG. 6 illustrating the arming and disarming function.

Referring to FIGS. 6 and 7, a preferred embodiment of the escape slide pack deployment system of the present invention is illustrated in greater detail. The deployment arm includes an inextensible portion 40 that rests in a recessed portion 42 of the upper plate 44 of the escape slide stowage pack. The deployment arm portion 40 is pivotally attached at a first end to a deployment arm bracket 46 affixed to the escape slide stowage pack. A bearing rod 48 passes through both the first end of the deployment arm portion 40 and through tabs 50 and 52 projecting upwardly from the bracket 46. The bearing rod 48 is held captive within the bracket 46 by threaded fasteners or other means 54 on either end of the rod. A bias spring 56 encircles the bearing rod 48 and tangs 58 and 60 of the spring engage the bracket 46. A central portion of the spring 56 is formed into a loop 62 that overlies the deployment arm portion 40 to transfer the biasing force of the spring to the portion 40 to hold the deployment arm flat against the upper plate 44 of the escape slide stowage pack. An extensible deployment rod 64 is mounted within the portion 40 and is longitudinally extensible from and retractable into the portion 40 through an opening formed in a second end of the portion 40. A keeper plate 66 is mounted at a first end of the rod 64 and is held in place by a fastening means 68. The keeper plate 66 has ears 69 and 70 that extend from it and ride within guide slots 72 and 74 formed in opposite sides of the deployment arm portion 40 to limit the travel of rod 64. A coil spring 76 encircles the rod and lies between the second end of the portion 40 and the keeper member 66 and in the expanded state is of such a dimension as to maintain the rod 64 retracted within the portion 40 to the extent permitted by keeper plate 66. The second end of the rod remains outside the portion 40. The rod 64 is illustrated in FIG. 8 in the armed state with its second end adjacent the inner skin 24 of the door 20. Two parallel hook tines 78 and 80 are affixed to a torque tube 28 pivotally mounted on the door skin 24 by means of a torque tube bracket 84. The hook tines 78 and 80 comprise the arming hook of the present invention. In the armed state shown in FIG. 6, the second end of the rod 64 is engaged by the tines 78 and 80 and held captive between the door skin 24 and the tines. The rod 64 has a crossbar 86 affixed at a right angle to the second end of the rod 64. Rollers 88 and 90 are rotatably mounted on opposite ends of crossbar 86 and are free to rotate on the crossbar 86. A ring keeper 92 is mounted on the rod 64 to prevent the rod from being drawn too far back into the portion 40 by the spring 76. The guide track assembly includes a channel member 94 that includes a rectangular bearing plate 96 spaced from the door skin by integral first and second spacer plates 98 and 100 that extend orthogonally from the bearing plate to the door skin. A backplate 99 is integrally formed with the spacer plates to complete the channel member. The backplate 99 lies flat against the skin 24 of the door. The channel member 94 is affixed to the door skin by a first flange plate 102 that extends upwardly from the backplate 99 and a second flange plate 104 that extends downwardly from the backplate 99. A plurality of fasteners 106 pass through the first and second flange plates and the door skin 24 in a conventional manner. The bearing plate 96 lies in a plane parallel to the door skin 24 and has a guide slot 108 formed in it running vertically along the entire length of the bearing plate 96. The hook tines 78 and 80 are aligned with the bearing plate 96 so as to guide the second end of the rod 64 into the guide track assembly with the rod 64 passing through the slot 108 formed in the bearing plate.

Referring now to FIG. 8, the dot-dash lines show the tines 78 and 80 of the hook assembly coming into engagement with the second end of rod 64, namely crossbar 86. It can be seen that in the unarmed state the rod 64 extends a short distance from the nonextensible portion 40 but does not reach all the way to the door skin 24. As the hook tines are placed in the armed position by movement of the control rod 30 in an upward direction, the tines 78 and 80 hook the crossbar 86 of the rod 64 and pull against the spring 76 to draw the end of rod 64 closer to the door skin 24 and bring it into alignment with the guide track assembly. Movement of the door 20 outboard and upward toward the open position will then pull the escape slide stowage pack 14 along with it since the rod 64 is only extendable a predetermined distance before the force on the rod is transferred to the nonextensible portion 40 and thus to the escape slide stowage pack. As was discussed earlier, as the door moves to the open position, the crossbar and particularly rollers 88 and 90 will ride down along the bearing plate 96 in the space between the bearing plate and the door skin until the crossbar passes out of the bottom of the channel member 94 and is free again. Preferably, the length of the channel member and the length of the rod 64 are such as to cooperate to not release the crossbar 86 from the channel member until the center of gravity of the escape slide and stowage pack are exterior to the aircraft. The force of gravity will then continue to act on the stowage pack to pull it the rest of the way out of the aircraft. The escape slide is meant to be used in emergency situations following an emergency landing or ditch at sea and therefore the possibility exists that when the aircraft is on the ground following such emergency landing, it may not be level, due to failure of a landing gear assembly or the lie of the land where it has come down. It is necessary that the escape slide deploy even in such tilted situations of the aircraft and therefore the dimensions of the deployment arm and guide track assembly are such that the escape slide stowage pack will be pulled out of the aircraft even if the aircraft is tilted at an angle of approximately seven degrees corresponding to a one-wing-up angle. The particular escape slide stowage pack for which the preferred embodiment of the deployment system of the present invention was designed folds out against the side of the aircraft as the escape slide is deployed. For this reason, the deployment arm is biased against the upper plate of the escape slide stowage pack so that upon release from the guide track assembly, it will lie flat against the escape slide stowage pack and, hence, flat against the side of the aircraft so that the deployment arm does not accidently poke a hole into the aircraft skin.

In summary, therefore, a deployment system for deploying an escape slide stowage pack from its position adjacent the sill area of an aircraft door opening, through the opening such that the center of gravity of the pack is outside the aircraft, includes a deployment arm pivotally affixed to the first end of the stowage pack and engageable by an arming hook at the second end, the arming hook being pivotally attached to the door of the aircraft. As the door is opened, the arming hook in the armed position guides the second end of the deployment arm into a guide track assembly mounted on the door and the second end of the deployment arm rides within the guide track assembly. The guide track and deployment arm are designed such that after the door has gone through a particular distance of travel toward the open position the deployment arm will be freed from the guide track assembly. The guide track and deployment arm are further designed so that at the point of disengagement of the deployment arm from the guide track assembly, the center of gravity of the escape slide stowage pack is exterior to the aircraft. The force of gravity will then continue to act on the stowage pack to bring it to its complete deployed position exterior of the aircraft. The arming hook is operable from within the aircraft to move to an unarmed position in which it does not engage the second end of the deployment arm so that the door can be opened in nonemergency situations without deploying the escape slide. While a preferred embodiment of the deployment system of the present invention has been described and illustrated, it will be apparent to those of ordinary skill in the art and others that several changes can be made while remaining within the scope of the invention. The invention should, therefore, be defined solely by reference to the appended claims.

The embodiments of the invention in which an exclusive property or privilege is claimed are defined as follows:

1. A deployment apparatus for use in moving an escape slide contained in a stowage pack from a position within an aircraft adjacent the sill area of a door opening in the aircraft fuselage, through the door opening to a position exterior to the aircraft fuselage, said aircraft including a door movably mounted in said door opening and operable to swingably move between an open position and a closed position, said deployment apparatus comprising:
   a rigid elongate deployment arm having a first portion, a first end of said first portion being swingably attached to said stowage pack, and a second portion slidably engaging said first portion such that a first end of said second portion is movable longitudinally with respect to said first portion to make said deployment arm extensible;
   arming means movably mounted on an interior surface of said door, said arming means being movable between a first position in which it is out of engagement with said deployment arm and a second position in which it cooperably engages said first end of said second portion of said deployment arm, said arming means engaging and capturing said first end of said second portion of said deployment arm as it moves from said first position to said second position; and
   elongate guide track means fixed to the interior surface of said door, said arming means cooperable with said guide track means when said arming means is in said second position to guide said first end of said second portion of said deployment arm into a first end of said guide track means as said door is moved from said closed position toward said open position, said first end of said second portion of said deployment arm moving along the elongate dimension of said guide track means as said door moves toward said open position until it exits from a second end of said guide track means when a predetermined degree of movement of said door has been exceeded.

2. The apparatus of claim 1, wherein said guide track means and said deployment arm are configured such that at the point of exit of said first end of said second portion of said deployment arm from said guide track means the center of gravity of said escape slide and stowage pack is exterior to said aircraft fuselage.

3. The apparatus of claim 2 further including:
   a handle means mounted on said interior of said door, said handle means being movable between an armed and an unarmed position;
   linkage means cooperably coupled to said arming means and said handle means, said linkage means operable to place said arming means in said first position when said handle means is in said unarmed position and to place said arming means in said second position when said handle means is in said armed position.

4. The apparatus of claim 1 wherein said arming means comprises a hook hingedly mounted on said door, said hook engaging said first end of said second portion of said deployment arm when said arming means is in said second position and being spaced from said first end of said second portion of said deployment arm when said arming means is in said first position.

5. The apparatus of claim 4 wherein said hook includes two parallel fingers and said first end of said second portion of said deployment arm includes a T-shaped rod having a shaft portion substantially normal to the surface of said door and a crossbar portion substantially parallel to the interior surface of said door, said parallel fingers lying on either side of said shaft portion and abutting said crossbar portion when said hook is in engagement with said first end of said second portion of said deployment arm.

6. The apparatus of claim 5 wherein said guide track means includes a first bearing plate spaced from said inner surface of said door and a second bearing plate spaced from said inner surface of said door, said first and second bearing plates being spaced from one another to define a slot, said shaft portion of said first end of said second portion of said deployment arm being received in said slot and said crossbar portion being received in the space between said inner surface of said door and said bearing plates when said first end of said second portion of said deployment arm is held captive in said guide track means.

7. The apparatus of claim 6 wherein said crossbar portion has a first and second end and further including a first roller rotatably mounted on said first end of said crossbar portion and a second roller rotatably mounted on said second end of said crossbar portion, said first and second rollers engaging said first and second bearing plates, respectively, when said first end of said second portion of said deployment arm is within said guide track means.

8. The apparatus of claim 1 further including first biasing means associated with said first portion of said deployment arm and said stowage pack to bias said deployment arm toward engagement with said stowage pack.

9. The apparatus of claim 8 further including second biasing means associated with said second portion of said deployment arm and said first portion of said deployment arm to bias said first end of said second portion of said deployment arm toward said first portion of said deployment arm.

* * * * *